United States Patent [19]
Shinohara

[11] Patent Number: 5,732,092
[45] Date of Patent: Mar. 24, 1998

[54] METHOD OF REFRESHING FLASH MEMORY DATA IN FLASH DISK CARD

[75] Inventor: Takayuki Shinohara, Tokyo, Japan

[73] Assignee: Mitsubishi Denki Kabushiki Kaisha, Tokyo, Japan

[21] Appl. No.: 675,290

[22] Filed: Jul. 1, 1996

[30]     Foreign Application Priority Data

Jan. 25, 1996   [JP]   Japan ................................ 8-010970

[51] Int. Cl.⁶ ..................................................... G11C 29/00
[52] U.S. Cl. ........................................ 371/40.2; 371/40.18
[58] Field of Search ................................ 371/40.11, 40.2, 371/40.18

[56]                 References Cited

U.S. PATENT DOCUMENTS

| | | | |
|---|---|---|---|
| 5,297,148 | 3/1994 | Harari et al. | 371/10.2 |
| 5,475,693 | 12/1995 | Christopherson et al. | 371/10.2 |
| 5,504,760 | 4/1996 | Harari et al. | 371/40.11 |
| 5,574,684 | 11/1996 | Tomoeda | 365/185.04 |

FOREIGN PATENT DOCUMENTS 60-268423   11/1985   Japan.
62-172158   7/1987    Japan.

*Primary Examiner*—Stephen M. Baker

[57]                 ABSTRACT

A method of refreshing flash memory data in a flash disk card (1) including a flash memory (4) to which data can be written by electrical operations, and an ECC circuit (11) which detects an error of the flash memory data and subsequently corrects the error when the flash memory data stored in the flash memory (4) are read. Hereupon, the method includes the step of reading the whole flash memory data stored in the flash memory (4) by a MPU (6) in the flash disk card (1), when an initialization processing of the flash disk card (1) is carried on after an electrical power has been supplied from an electrical power source to the flash disk card (1). Thus, the reading step is performed as a part of the initialization processing. Further, the method includes the step of rewriting corrected data to the flash memory (4) by the MPU (6) when an error is detected and subsequently corrected by the ECC circuit (11) for the flash memory data read out of the flash memory (4).

5 Claims, 4 Drawing Sheets

METHOD OF REFRESHING FLASH MEMORY DATA IN FLASH DISK CARD

FIELD OF THE INVENTION

The present invention relates to a method of refreshing flash memory data in a flash disk card including a flash memory which is used as an external storage medium of an information processing equipment.

DESCRIPTION OF THE PRIOR ART

In general, there is well known a flash memory, which is one of nonvolatile memories to each of which data can be written or erased by electrical operations. A memory cell of the above-mentioned type of flash memory is generally composed of a double gate type of memory transistor which has a control gate and a floating gate, each of the gates being disposed on a substrate. In the above-mentioned type of memory transistor, there is caused such a phenomenon that its threshold value is changed by injecting electrons to the floating gate which is electrically insulated from the surroundings or by drawing electrons therefrom. Thus, the memory transistor stores data utilizing the above-mentioned phenomenon. Namely, in the memory transistor, when the threshold value is higher, it is defined that the memory transistor is storing the value of "0" (or "1"). On the other hand, when the threshold value is lower, it is defined that the memory transistor is storing the value of "1" (or "0"). Hereupon, as methods for injecting electrons into the floating gate, there are conventionally known such a method that hot electrons are injected into the floating gate and such a method that electrons are injected into the floating gate utilizing the tunnel effect. On the other hand, as a method for drawing electrons from the floating gate, a method utilizing the tunnel effect is generally used.

In the flash memory having the above-mentioned structure, when data writing and data erasing, namely injection and drawing of electrons for the floating gate are repeated, an insulating oxide film provided between the floating gate and the substrate is gradually deteriorated. Therefore, the injected electrons in the floating gate gradually leak out so that the data holding characteristics of the flash memory or the reliability of the data stored in the flash memory may be lowered.

In order to solve the above-mentioned problem, conventionally, a refreshing treatment is performed for the flash memory, for example as disclosed in Japanese patent laid-open publication No. 62-128097 or Japanese patent laid-open publication No. 64-17300. In the refreshing treatment, two different voltages are successively applied to the gate of the memory transistor when the data are read out of the flash memory, and then it is examined whether the data holding characteristics of the flash memory or the reliability of the data is lowered or not in accordance with the judgment of the identity between the two kinds of data which are read with the different voltages (check processing). Hereupon, if the data holding characteristics of the flash memory or the reliability of the data is lowered, the refreshing processing, such as rewriting of the data is performed. Namely, if the data corresponding to one of the two different voltages is not identical with the data corresponding to the other, it is judged that the data holding characteristics of the flash memory or the reliability of the data is lowered so that the refreshing processing of the flash memory is performed.

However, in the above-mentioned conventional flash memory, since the check processing (confirmation action) is performed on every data reading occasion, there occurs such a problem that the reading speed of the data is considerably lowered. Further, since it is required that a circuit for generating different voltages and a circuit for comparing the data which is read with the different voltages are provided on an individual semiconductor memory element, there occurs such a problem that the manufacturing cost of the flash memory namely the manufacturing cost of the flash disk card is raised.

SUMMARY OF THE INVENTION

The present invention has been developed to solve the above-mentioned conventional problems, and has an object of providing a technique for detecting the deterioration of the data holding characteristics of the flash memory provided in the flash disk card or the reliability of the data in early time so as to be able to improve the data holding characteristics or the reliability of the data by data rewriting or the like, without causing such a disadvantage that the reading speed of the data is lowered or the manufacturing cost of the flash memory is raised.

Thus, according to a first aspect of the present invention which is developed to achieve the above-mentioned object, there is provided a method of refreshing flash memory data in a flash disk card including a flash memory to which data can be written by electrical operations, and an ECC circuit (error detecting and correcting circuit) which detects an error of the flash memory data and subsequently corrects the error when the flash memory data stored in the flash memory are read. Hereupon, the method includes the step of reading the whole flash memory data stored in the flash memory by means of a MPU (micro processor unit) provided in the flash disk card, when an initialization processing of the flash disk card is performed after an electrical power has been supplied from an electrical power source to the flash disk card. Thus, the reading step is performed as a part of the initialization processing. Further, the method includes the step of rewriting corrected (right) data to the flash memory by means of the MPU when an error is detected and subsequently corrected (when an ECC error occurs) by the ECC circuit for the flash memory data read out of the flash memory.

In the above-mentioned method, on every occasion that the electrical power is supplied to the flash disk card, the MPU of the flash disk card reads the flash memory data stored in the flash memory of the flash disk card in time of the initialization processing. Hereupon, the reading step is performed as a part of the initialization processing. Thus, if an error is detected and subsequently corrected by the ECC circuit, corrected right data are rewritten to the flash memory. Therefore, even if there is caused leaking of the injected electrons in the floating gate of the flash memory (memory transistor) by putting the flash disk card in an unused state for a long time, the flash memory is refreshed so that the data holding characteristics of the flash disk card or the reliability of the data is improved.

Further, in the method, since the check processing or the refreshing processing is not always performed on every occasion of data reading, the data reading speed is not lowered. Moreover, since it is not necessary to provide a circuit for generating different kinds of voltage to read the data or a circuit for comparing the read data for every individual semiconductor memory element, the cost for manufacturing the flash disk card is lowered.

In the method according to the first aspect of the present invention, it is preferable that the initialization processing of the flash disk card is performed with a voltage which is higher than that of an ordinary electrical power source. In the flash memory, generally, the voltage applied to the control gate at the time of data reading depends on the voltage of the electrical power source. Therefore, when the data stored in the flash memory are read with the voltage which is higher than the ordinary source voltage, the detection accuracy of reversed data is improved with respect to the memory transistor whose threshold value is lowered due to leaking of the injected electrons in the floating gate. Consequently, the data holding characteristics of the flash disk card or the reliability of the data is further improved.

Further, according to a second aspect of the present invention, the flash disk card is constructed so as to be able to be mounted on (inserted to) a host equipment at any time. Thus, the method includes the steps of reading the whole flash memory data stored in the flash memory with a voltage which is higher than that of the ordinary electrical power source by means of a CPU (central processing unit) provided in the host equipment after the flash disk card has been mounted on (inserted to) the host equipment. Moreover, the method includes the step of rewriting corrected data to the flash memory by means of the CPU when an error is detected and subsequently corrected by the ECC circuit for the flash memory data read out of the flash memory.

In the method according to the second aspect of the present invention, on every occasion that the flash disk card is mounted on (inserted to) the host equipment, the CPU in the host equipment reads the flash memory data stored in the flash memory of the flash disk card with the voltage which is higher than the ordinary voltage for data reading. Thus, if an error is detected and subsequently corrected by the ECC circuit, corrected right data are rewritten to the flash memory. Therefore, even if there is caused leaking of injected electrons in the floating gate of the flash memory (memory transistor) by putting the flash disk card in an unused state for a long time, the flash memory is refreshed so that the data holding characteristics of the flash disk card or the reliability of the data is improved.

Further, in the method, since the check processing or the refreshing processing is not always performed every occasion of data reading, the data reading speed is not lowered. Moreover, since it is not necessary to provide a circuit for generating different kinds of voltage to read the data or a circuit for comparing the read data for every individual semiconductor memory element, the cost for manufacturing the flash disk card is lowered.

In the method according to the second aspect of the present invention, it is preferable that there is judged whether an unused term of the flash disk card is longer than a predetermined allowable time or not by the CPU of the host equipment when the flash disk card is mounted on the host equipment, and then the data stored in the flash memory is read or rewritten if the unused term is longer than the allowable time. Hereupon, the unused term of the flash disk card may be detected by measuring an elapsed period between a time which the flash disk was mounted on the host equipment at the last occasion and a time which the flash disk card has been mounted on the host equipment at the present occasion, by means of a realtime clock circuit provided in the host equipment.

In the method, since the check processing or the refreshing processing is performed as far as the flash disk card has been put in the unused state longer than the predetermined allowable time, it is prevented that the check processing or the refreshing processing is performed excessively or more than it is needed.

BRIEF DESCRIPTION OF THE DRAWINGS

These and other objects, features and advantages of the present invention will become clear from the following description taken in conjunction with the preferred embodiment with reference to the accompanying drawings, and in which.

DETAILED DESCRIPTION OF THE PREFERRED EMBODIMENT

Hereinafter, some preferred embodiments of the present invention will be concretely described with reference to the accompanying drawings.

<First Embodiment>

Figure 1:
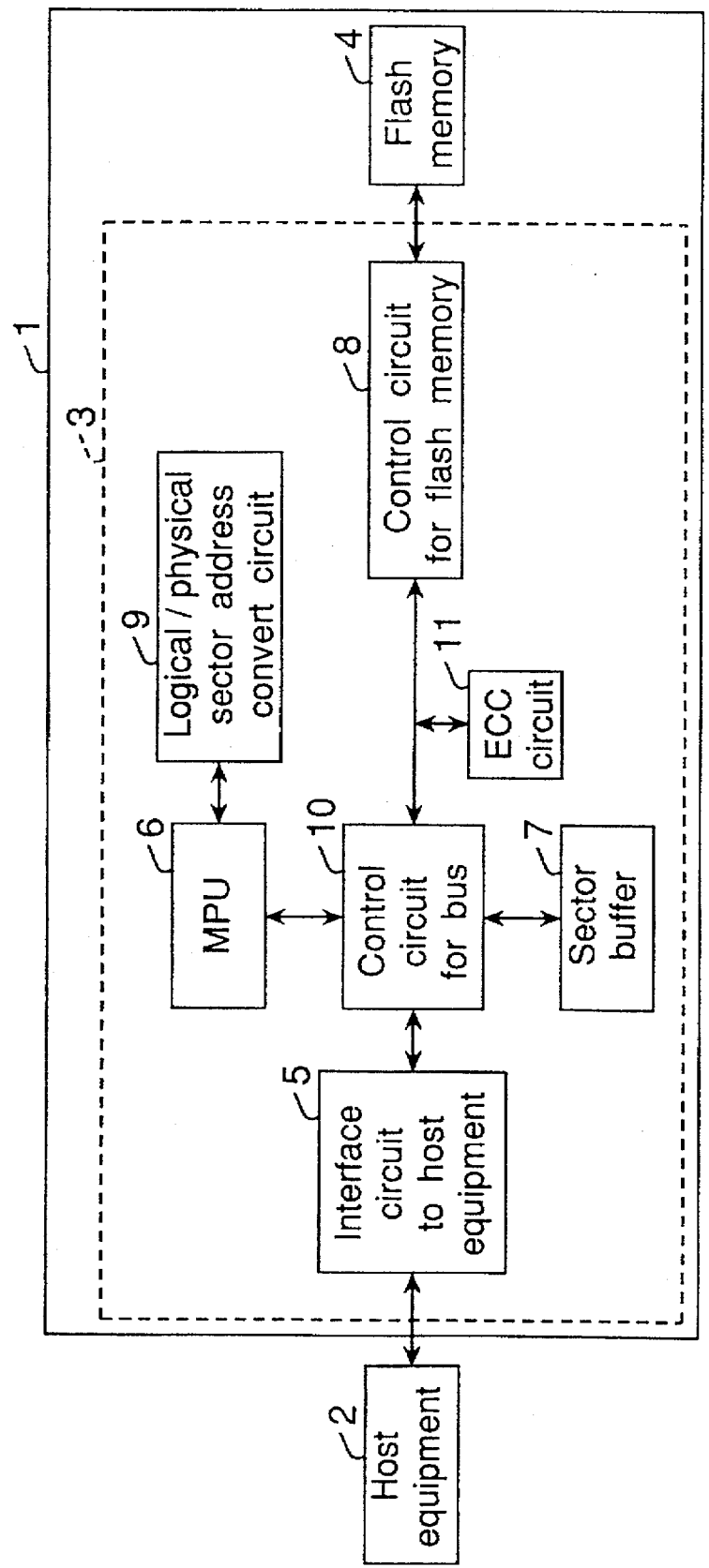
FIG. 1 is a functionally represented block diagram of a flash disk card according to the first embodiment of the present invention.

Hereinafter, the first embodiment of the present invention will be described with reference to FIG. 1. FIG. 1 is a functionally represented block diagram of a flash disk card to which a check processing or a refreshing processing according to the present invention is performed.

As shown in FIG. 1, a flash disk card 1, which is a kind of external storage equipment (medium), is constructed so as to be able to be mounted on (inserted to) a host equipment 2, which is a kind of information processing equipment, at any time if necessary. Hereupon, the flash disk card 1 includes a flash disk control circuit 3 for controlling the flash disk card 1, and a flash memory 4 which is a kind of nonvolatile memory to which data can be written or erased by electrical operations. Thus, in the flash disk control circuit 3, there are provided an interface circuit 5 (to-host interface circuit) for connecting the flash disk card 1 to the host equipment 2, a MPU 6 (micro processor unit) composed of a one-chip type of micro computer, a sector buffer 7, a control circuit 8 (flash memory control circuit) for controlling the flash memory 4, a logical/physical sector address convert circuit 9, a control circuit for bus 10, an ECC circuit 11 (error detecting and correcting circuit) which detects a data error and subsequently corrects the data error when the data stored in the flash memory 4 is read or data are written to the flash memory 4, and a wiring (bus) for electrically connecting the above-mentioned various elements one another. Hereupon, each of the elements included in the flash disk control circuit 3 can be integrated in one IC (integrated circuit).

Hereupon, an electrical and physical specification of the interface between the flash disk card 1 and the host equipment 2 is standardized as PC Card ATA Specification by two organization of JEIDA (Japan Electronic Industry Development Association of Corporate Juridical Person) and PCMCIA (Personal Computer Memory Card International Association). Therefore, since the specification of the interface is generally well known, its detailed description will be omitted.

In the system including the flash disk card 1 and the host equipment 2, when electrical power is supplied from an electrical power source (not shown) to the flash disk card 1 (power-on action), the MPU 6 first performs an initialization processing to the circuits or programs of the flash disk card 1 (initialization processing of the circuits in the card after power-on action). Hereupon, such an initialization processing as same as the above is also performed when the flash disk card 1 is reset after the power-on action. Then, in the flash disk card 1, the MPU 6 reads the whole data stored in the flash memory 4 as a partial operation in the initialization processing of the flash memory 4. Thus, when the injected electrons held in the floating gate (not shown) of the memory transistor leak, the threshold value of the memory transistor is lowered so that reversed data are read. Hereupon, the gate is a component of the memory cell of the flash memory 4. In consequence, a reading error is detected by the ECC circuit 11, and consequently the MPU 6 judges that the injected electrons in the floating gate of the sector leak, and then rewrites corrected data to the sector.

As mentioned above, in the system according to the first embodiment, on every occasion that the electrical power is supplied to the flash disk card 1, the MPU 6 in the flash disk card 1 reads the whole data stored in the flash memory 4 in the flash disk card 1. Thus, if an error (ECC error) is caused, corrected right data are rewritten to the flash memory 4. In consequence, even if there is caused leaking of injected electrons in the floating gate of the flash memory 4 (memory transistor) by putting the flash disk card 1 in an unused state for a long time or the like, the flash memory 4 (memory transistor) can be refreshed so that there is obtained such a effect that the data holding characteristics of the flash disk card 1 or the reliability of the data may be improved.

In the first embodiment, the reading processing of the whole data stored in the flash memory 4, which is a part of the initialization processing after supplying electrical power to the flash disk card 1, is performed by the MPU 6 in the flash disk card 1. However, even if the reading processing is performed by the host equipment 2, the same effect as the above may be obtained.

Further, in the first embodiment, the refreshing processing is performed as a part of the initialization processing after electrical power supplying to the flash disk card 1. However, in return for the above, the refreshing processing may be performed at any time in accordance with a refresh command output from the host equipment 2. In this case, it is possible to perform the refreshing processing at a convenient occasion that an user requires it.

<Second Embodiment>

Figure 2:
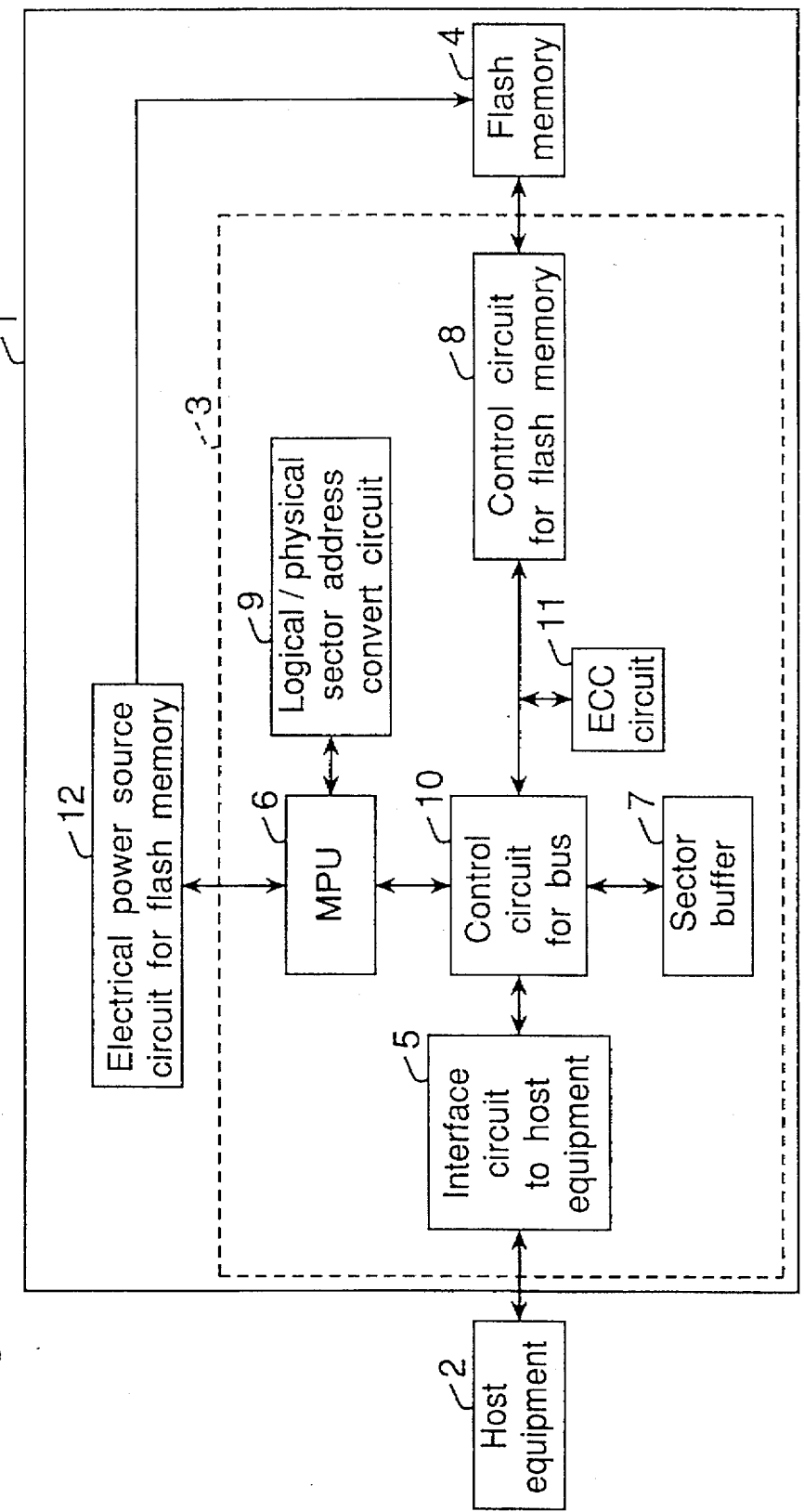
FIG. 2 is a functionally represented block diagram of a flash disk card according to the second embodiment of the present invention.

Hereinafter, the second embodiment of the present invention will be described with reference to FIG. 2. FIG. 2 is a functionally represented block diagram of another flash disk card 1 to which a refreshing processing according to the present invention is performed. Hereupon, in order to avoid duplicate descriptions with the first embodiment, members in FIG. 2 common to those in the first embodiment shown in FIG. 1 are affixed with same reference numerals, and then explanations of the members is fundamentally omitted.

As shown in FIG. 2, in the second embodiment, an electrical power source circuit 12 for directly supplying a electrical power to the flash memory 4 is provided in the flash disk card 1.

Thus, in the system according to the second embodiment, when the electrical power is supplied from the electrical power source to the flash disk card 1, the MPU 6 first performs an initialization processing to the circuits or programs of the flash disk card 1 (initialization processing of the circuits in the card after power-on action). In the flash disk card 1 according to the second embodiment, the reading processing of the whole data stored in the flash memory 4, which is a part of the initialization processing of the flash memory 4, is performed with electrical source voltage which is higher than the ordinary voltage for data reading. The control of the electrical source voltage is performed by the electrical power source circuit 12 for the flash memory 4 in accordance with an instructive information output from the MPU 6. In the flash memory 4, generally, the voltage applied to the control gate at the time of data reading depends on the electrical source voltage. Thus, since the data is read with the electrical source voltage higher than the ordinary voltage, reversed data are read more surely in the memory transistor whose threshold value is lowered due to leaking of the injected electrons in the floating gate. In consequence, since a reading error is detected by the ECC circuit 11, the MPU 6 judges that the injected electrons in the floating gate of the sector leak, and then rewrites corrected data to the sector.

As mentioned above, in the system according to the second embodiment, on every occasion that the electrical power is supplied to the flash disk card 1, the MPU 6 in the flash disk card 1 reads the whole data stored in the flash memory 4 in the flash disk card 1 with the electrical source voltage which is higher than the ordinary reading voltage. Thus, if an error is caused, corrected right data are rewritten to the flash memory 4. In consequence, when there is caused leaking of the injected electrons in the floating gate of the flash memory 4 (memory transistor) by putting the flash disk card 1 in an unused state for a long time or the like, the leaking can be detected before the data are reversed so that the flash memory 4 can be refreshed. Therefore, there is obtained such a effect that the data holding characteristics of the flash disk card 1 or the reliability of the data may be improved.

Further, in the second embodiment, the refreshing processing is performed as a part of the initialization processing after electrical power supplying to the flash disk card 1. However, in return for the above, the refreshing processing may be performed at any time in accordance with a refresh command output from the host equipment 2. In this case, it is possible to perform the refreshing processing at a convenient occasion that an user requires it.

<Third Embodiment>

Hereinafter, the third embodiment of the present invention will be described with reference to FIG. 3. In the second embodiment described above, the check processing of the data stored in the flash memory 4 after electrical power supplying to the flash disk card 1 is performed by means of the MPU 6 in the flash disk control circuit 3 of the flash disk card 1. However, in the third embodiment, the check processing is performed by a CPU (central processing unit) in the host equipment 2.

Figure 3:
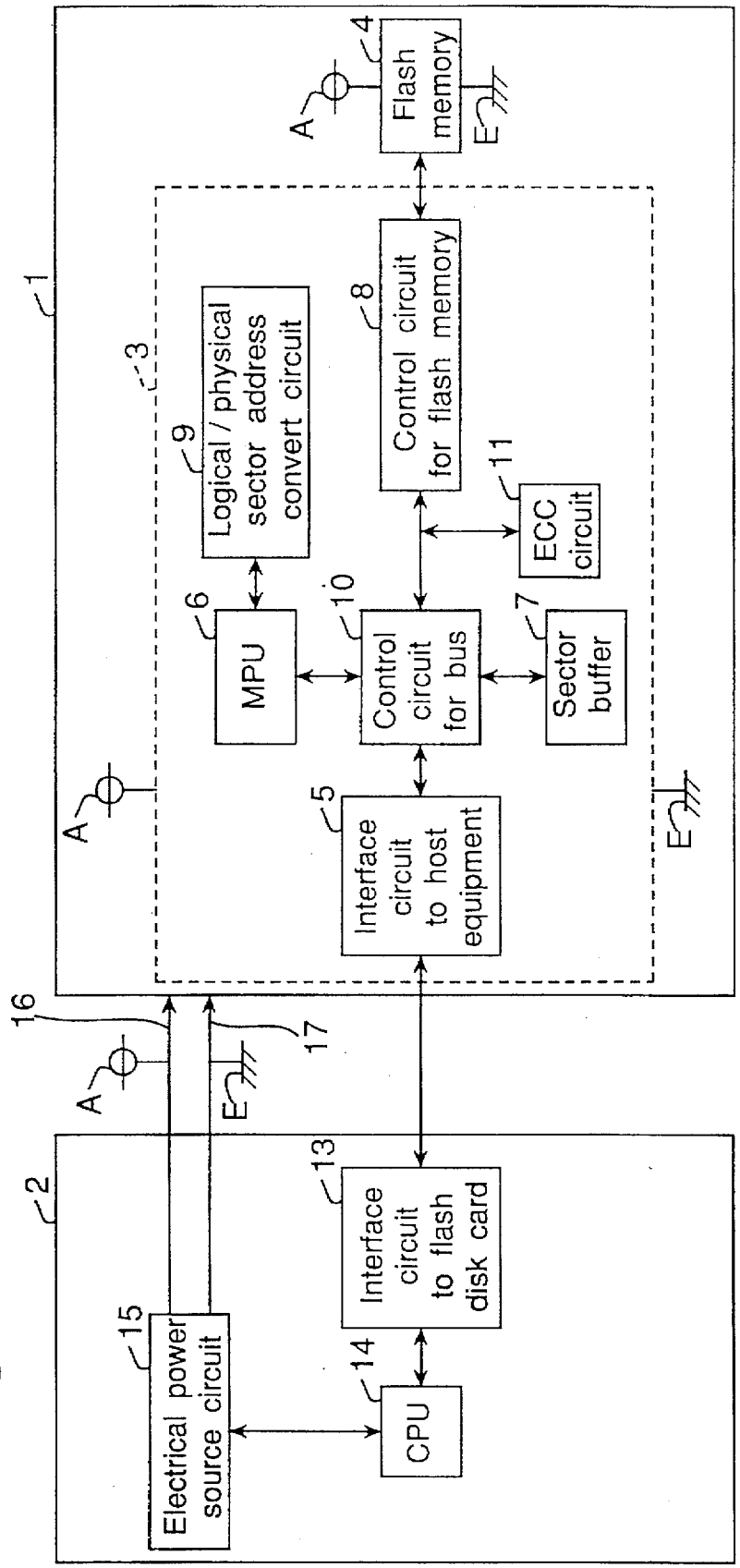
FIG. 3 is a functionally represented block diagram of a flash disk card according to the third embodiment of the present invention and a to-card interface portion of a host equipment on which the flash disk card is mounted.

FIG. 3 is a functionally represented block diagram of a flash disk card 1 and a to-card interface portion of the host equipment 2 on which the flash disk card 1 is mounted (inserted), according to the third embodiment. Hereupon, in order to avoid duplicate descriptions with the first or second embodiment, members in FIG. 3 common to those in the first or second embodiment shown in FIG. 1 or 2 are affixed with same reference numerals, and then explanations of the members is fundamentally omitted. Thus, in FIG. 3, "A" represents a wiring connected with the electrical power source, and then "E" represents a ground portion (earth).

As shown in FIG. 3, in the host equipment 2, there are provided an interface circuit 13 for connecting the host equipment 2 to the flash disk card 1, a CPU 14 (central processing unit) for controlling the interface circuit 13 or the like, an electrical power source circuit 15 for supplying electrical power to the flash disk card 1, an electrical source terminal 16 for the flash disk card 1, and a ground terminal 17 for the flash disk card 1. Hereupon, the electrical source terminal 16 and the ground terminal 17 are connected to the electrical power source (electrical source wiring A) and the ground portion E of the circuit in the card, respectively.

When the CPU 14 receives an information indicating such a fact that the flash disk card 1 is mounted on the host equipment 2, from the interface circuit 13, the CPU 14 commands the electrical power source circuit 15 to supply ordinary electrical power and then performs a configuration of the flash disk card 1 through the interface circuit 13. After the configuration processing has been completed, the CPU 14 commands the electrical power source circuit 15 to supply electrical source voltage higher than the ordinary voltage. Then, the CPU 14 reads the whole data stored in the flash memory 4 of the flash disk card 1, and then examines whether an ECC error is caused or not. Hereupon, if the ECC error is detected, corrected data are rewritten to the logical address in which the error has been caused.

As mentioned above, in the system according to the third embodiment, on every occasion that the flash disk card 1 is mounted on (inserted to) the host equipment 2, the CPU 14 in the host equipment 2 reads the whole data stored in the flash memory 4 of the flash disk card 1 with the electrical source voltage which is higher than the ordinary reading voltage. Thus, if an ECC error is caused, corrected right data are rewritten to the flash memory 4. In consequence, when there is caused leaking of the injected electrons in the floating gate of the flash memory transistor by putting the flash disk card 1 in an unused state for a long time or the like, the flash memory transistor can be refreshed. Therefore, there is obtained such a effect that the data holding characteristics of the flash disk card 1 or the reliability of the data may be improved.

<Fourth Embodiment>

Hereinafter, the fourth embodiment of the present invention will be described with reference to FIG. 4. In the above-mentioned second embodiment, the check processing or the refreshing processing of the data stored in the flash memory 4 is performed on every occasion that the electrical power is supplied to the flash disk card 1. Further, in the above-mentioned third embodiment, the check processing or the refreshing processing is performed on every occasion that the flash disk card 1 is mounted on (inserted to) the host equipment 2. However, in the processing, since there are accompanied a process for changing the electrical source voltage and a process for reading the whole data stored in the flash memory 4, it takes a relatively long time for the processing (excessive time is required). On the other hand, since the leaking phenomenon of the injected electrons in the floating gate of the flash memory 4 (memory transistor) is caused gradually, it is effective (preferable) that the leaking examination is performed after the flash disk card 1 has been put in an unused state for a relatively long time. Therefore, in the fourth embodiment, it is examined whether the flash disk card 1 has been put in an unused state for a long time, the refreshing processing is effectively performed in accordance with the examined result.

Figure 4:
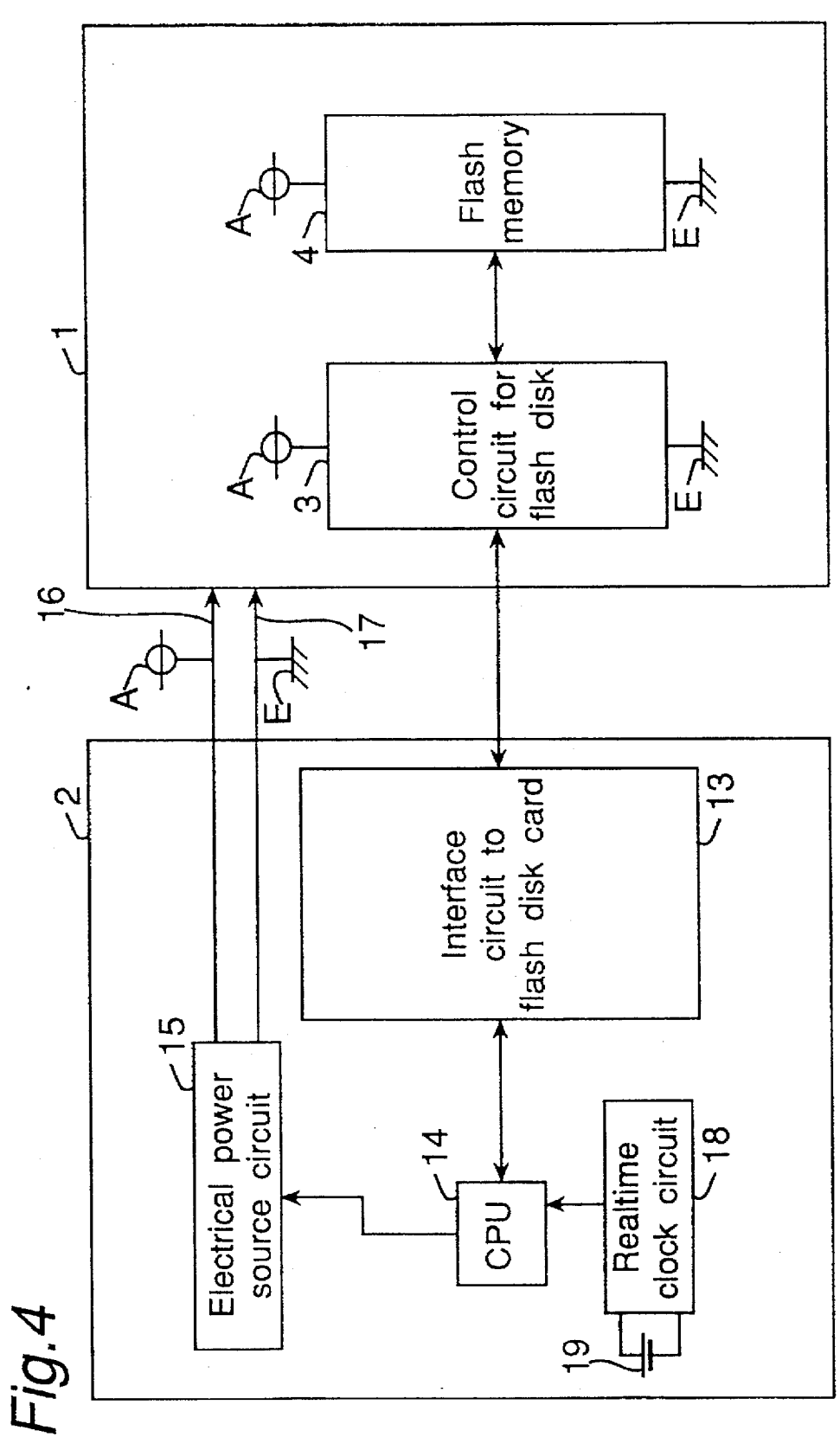
FIG. 4 is a functionally represented block diagram of a flash disk card according to the fourth embodiment of the present invention and a to-card interface portion of a host equipment on which the flash disk card is mounted.

FIG. 4 is a functionally represented block diagram of a flash disk card 1 and a to-card interface portion of the host equipment 2 on which the flash disk card 1 is mounted (inserted), according to the fourth embodiment. Hereupon, in order to avoid duplicate descriptions with any one of the first to third embodiments, members in FIG. 4 common to those in any one of the first to third embodiments shown in FIGS. 1 to 3 are affixed with same reference numerals, and then explanations of the members is fundamentally omitted.

As shown in FIG. 4, in the host equipment 2, there is provided a realtime clock circuit 18. Hereupon, the realtime clock circuit 18 has a supplementary electrical power source 19 which is independent of the main electrical power source of the host equipment 2. Thus, the realtime clock circuit 18 outputs clock signals (time) and calendar data in accordance with a demand of the CPU 14 in the host equipment 2. On every occasion that an insertion of the flash disk card 1 is detected, the CPU 14 in the host equipment 2 reads the calendar data stored in a specified address of the flash disk card 1 at the final stage of the initialization processing of the flash disk card 1, and then compares the calendar data with the present calendar data which have just been read from the realtime clock circuit 18. In consequence of the comparison, if the difference (time interval) between the two calendar data is larger than a predetermined term (predetermined days), the check processing or the refreshing processing as shown in the above-mentioned third embodiment is performed. On the other hand, in consequence of the comparison, if the difference between the two calendar data is equal to or smaller than the predetermined term, or if the above-mentioned check processing or the refreshing processing has been completed, the calendar data stored in the specified address is renewed with the present calendar date, and then the initialization processing is completed.

As mentioned above, in the system according to the fourth embodiment, since the check processing or the refreshing processing of the flash memory 4 is performed only in the occasion that the flash disk card 1 has been put in an unused state for a period longer than the predetermined time, the check processing or the refreshing processing may be effectively achieved.

Although, the present invention has been described in terms of preferred embodiments, it will be apparent to those of skill in the art that numerous variations and modifications may be made without departing from the true spirit and scope thereof, as set forth in the following claims.

What is claimed is:

1. A method of refreshing flash memory data in a flash disk card including a flash memory to which data are able to be written by an electrical operation, and an error detecting and correcting circuit which detects an error of the flash memory data and subsequently corrects the error when the flash memory data stored in said flash memory are read, said method comprising the steps of:

reading the whole flash memory data stored in said flash memory by means of a micro processor unit provided in said flash disk card, when an initialization processing of said flash disk card is performed after an electrical power has been supplied from an electrical power source to said flash disk card, said reading step being performed as a part of the initialization processing; and rewriting corrected data to said flash memory by means of said micro processor unit when an error is detected and subsequently corrected by said error detecting and correcting circuit for the flash memory data read out of said flash memory.

2. The method recited in claim 1, wherein the initialization processing of said flash disk card is performed with a voltage which is higher than a voltage of an ordinary electrical power source.

3. A method of refreshing flash memory data in a flash disk card including a flash memory to which data are able to be written by an electrical operation, and an error detecting and correcting circuit which detects an error of the flash memory data and subsequently corrects the error when the flash memory data stored in said flash memory are read, said flash disk card being constructed so as to be able to be mounted on a host equipment at any time, said method comprising the steps of:

reading the whole flash memory data stored in said flash memory with a voltage which is higher than a voltage of an ordinary electrical power source by means of a central processing unit provided in said host equipment after said flash disk card has been mounted on said host equipment; and rewriting corrected data to said flash memory by means of said central processing unit when an error is detected and subsequently corrected by said error detecting and correcting circuit for the flash memory data read out of said flash memory.

4. A method of refreshing flash memory data in a flash disk card including a flash memory to which data are able to be written by an electrical operation, and an error detecting and correcting circuit which detects an error of the flash memory data and subsequently corrects the error when the flash memory data stored in said flash memory are read, said flash disk card being constructed so as to be able to be mounted on a host equipment at any time, said method comprising the steps of:

judging whether such an unused term that said flash disk card has been set in an unused state is longer than a predetermined allowable time or not by means of a central processing unit provided in said host equipment when said flash disk card is mounted on said host equipment;

reading the whole flash memory data stored in said flash memory with a voltage which is higher than a voltage of an ordinary electrical power source by means of said central processing unit if said unused term is longer than said allowable time; and rewriting corrected data to said flash memory by means of said central processing unit when an error is detected and subsequently corrected by said error detecting and correcting circuit for the flash memory data read out of said flash memory.

5. The method recited in claim 4, wherein said unused term of said flash disk card is detected by measuring an elapsed period between a time which said flash disk was mounted on said host equipment at the last occasion and a time which said flash disk card has been mounted on said host equipment at the present occasion, by means of a realtime clock circuit provided in said host equipment.

* * * * *